United States Patent [19]
Valentin

[11] 4,223,533
[45] Sep. 23, 1980

[54] DEVICE FOR THE POWER-ASSISTED CONTROL OF A HYDRAULIC TRANSMITTER

[75] Inventor: M. Daniel Valentin, Rueil Malmaison, France

[73] Assignee: Regie Nationale des Usines Renault, Boulogne-Billancourt, France

[21] Appl. No.: 8,783

[22] Filed: Feb. 1, 1979

[30] Foreign Application Priority Data
Feb. 27, 1978 [FR] France .............................. 78 05486

[51] Int. Cl.³ .......................................... B60T 13/00
[52] U.S. Cl. ................................. 60/547 R; 60/548; 60/555
[58] Field of Search ................. 60/533, 547, 548, 555, 60/591

[56] References Cited
FOREIGN PATENT DOCUMENTS
2331468 6/1977 France .
2345324 10/1977 France .

Primary Examiner—Edgar W. Geoghegan
Attorney, Agent, or Firm—Oblon, Fisher, Spivak, McClelland & Maier

[57] ABSTRACT

A device for the power-assisted control of a hydraulic transmitter is disclosed which includes a transmitter cylinder having a first and second bore provided therein, a main piston with a bore hole, disposed in the cylinder, valve means disposed in the bore of the cylinder, a fluid source communicated with the cylinder, a control piston movably disposed in the second bore and having a control section and a second section formed thereon wherein the control section of the control piston is larger than the second section of the control piston.

6 Claims, 2 Drawing Figures

DEVICE FOR THE POWER-ASSISTED CONTROL OF A HYDRAULIC TRANSMITTER

BACKGROUND OF THE INVENTION

Field of the Invention

The invention relates to a device for the power-assisted control of a hydraulic transmitter for the brakes or the clutch of a vehicle by means of an auxiliary pressure thrust which reduces the control effort that the vehicle operator must exert.

The invention relates more particularly to a hydraulic control device that uses the fluid outflow of a pump.

SUMMARY OF THE INVENTION

The invention concerns a hydraulic control device which uses fluid outflow of an auxiliary pump such as a feed pump in the control circuit of a steering, braking or suspension mechanism, which reduces the control effort required of the operator while maintaining a correct feel for the disengagement/engagement sequence.

The invention also concerns a hydraulic control device whose dimensional characteristics limited to one component permit, on the one hand, limitation of the control effort and, on the other hand, reduced travel for the control pedal.

The invention concerns, in addition, a hydraulic control device dimensioned to obtain predetermined variation in the control effort exerted on the pedal that is related to the latter's travel.

Another object of the invention is a hydraulic control device that allows for increased travel of a disengagement stop and/or improved graduality for the engagement thereof.

The invention is concerned more particularly with a transmitting cylinder control device, in particular for the boosted control of a friction clutch including a master cylinder featuring a piston with bore hole and valve, such piston being capable of connecting the receiver cylinder with the source of fluid.

In accordance with the invention, the transmitter cylinder features a bore connected to the receiver cylinder, a mobile control piston in the bore which presents a control section acting on the fluid flow between the source of fluid and an outlet port from the transmitter cylinder.

The device thus conceived can be mounted instead of and in place of the conventional transmitter master cylinder heretofore used in the hydraulic clutch or brake control design for vehicles. One embodiment of the control device in accordance with the invention is described below as a non-limiting example with reference to the attached drawing.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
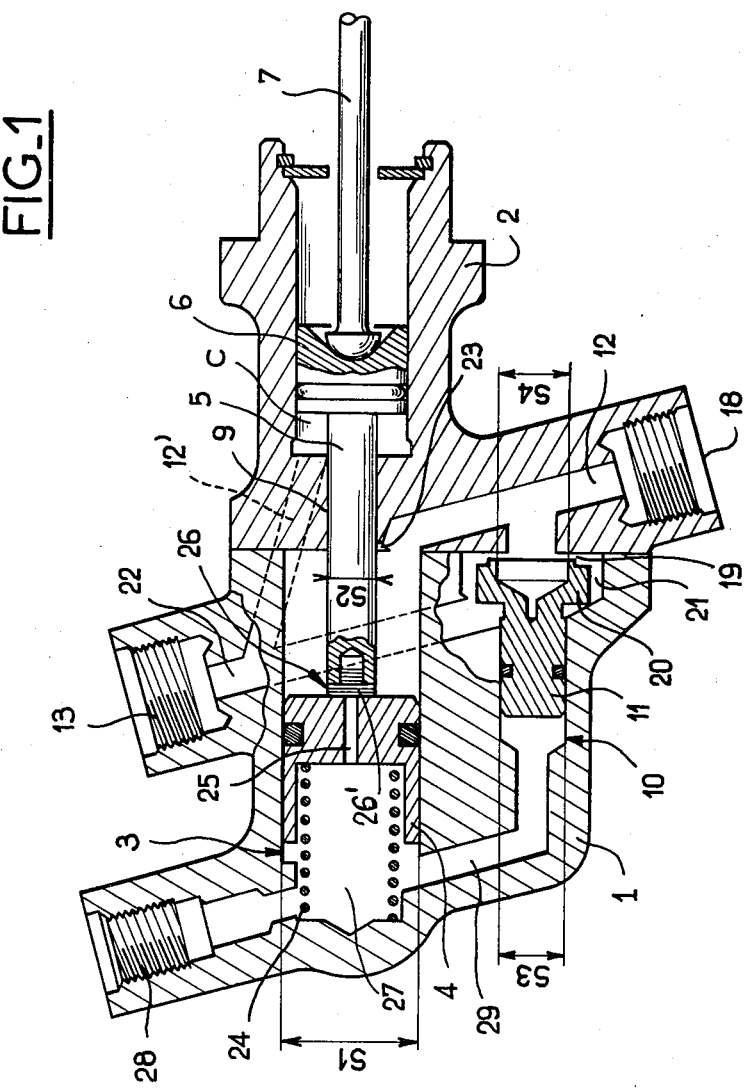
FIG. 1 is an axial section of the boosted cylinder of the present invention.
Figure 2:
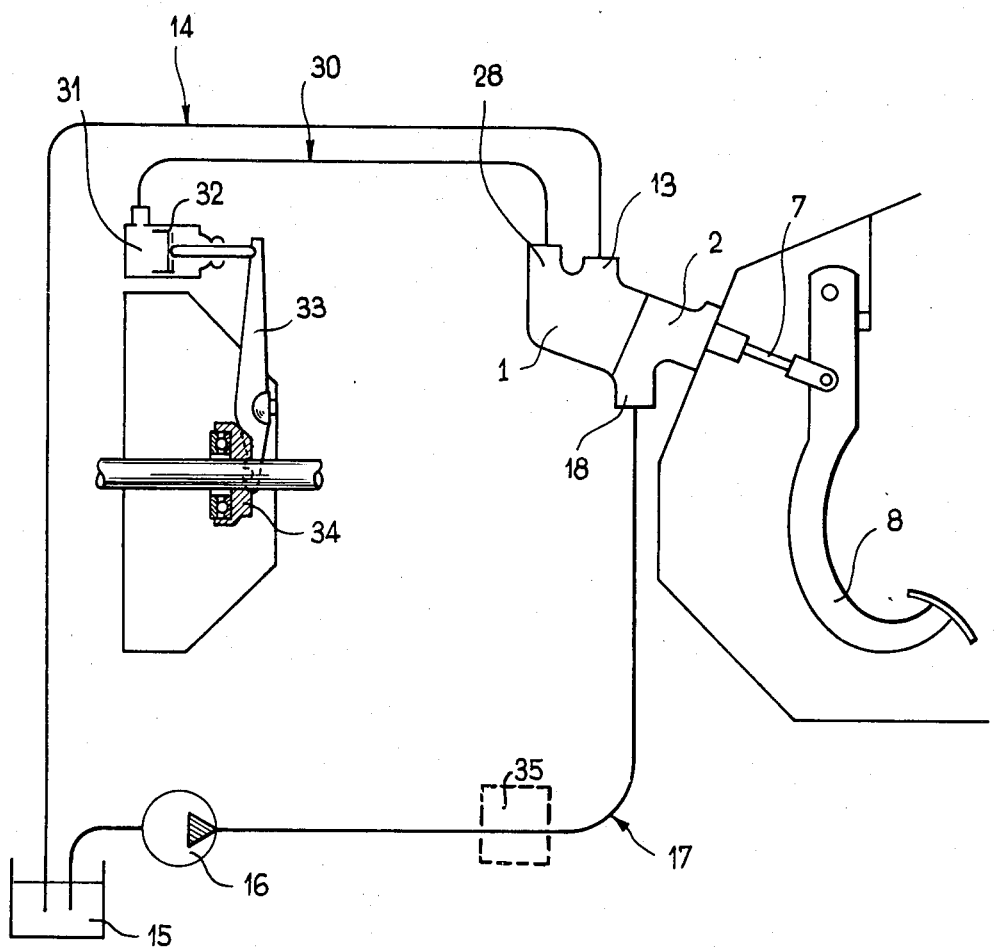
FIG. 2 is a diagrammatic view of clutch control using the cylinder shown in FIG. 1.

An examination of FIG. 1 reveals that the cylinder body is made of two parts, 1 and 2, joined along a plane that forms a hermetic seal. The main part 1 of the cylinder features a bore 3 for a main piston 4 with section S1 mounted so as to slide axially in bore 3 owing to the action of a push rod 5 whose section or diameter is designated by S2. The push rod 5 is rigidly joined to a guide piston 6 moved by the operating rod 7 connected to the control pedal 8 of the clutch as depicted in FIG. 2. The guide piston 6 and the push rod 5 are guided by a bore 9 in part 2 of the cylinder.

In accordance with the invention, the main part of the cylinder has another bore 10 and a control piston 11 with section S3 which moves in bore 10. The bores 3 and 10 are connected by a feed canal or passage 12 and the outlet port 13 is connected by means of outside tubing or conduit 14 for communicating fluid to a reservoir 15. A source of fluid with a regulated outflow, such as pump 16, feeds a conduit 17 connecting with the inlet port 18 of the cylinder which is machined into part 2 of the latter.

Communication between pump 16 and re-entry into the reservoir 15 is thus provided, as shown in FIG. 1, by the inlet port 18, the passage 12, a constriction 19 in the head 20 of the control piston 11, a chamber 21 located at the end of bore 10, a canal or passage 22 whose extremities lead respectively into chamber 21 and to outlet port 13, and by conduit 14.

In accordance with the particular feature of the device, chamber 21 is limited by the plane that joins parts 1 and 2, and has its largest opening at the joining surface of part 2. The constriction 19, on the other hand, is defined by the distance between the surface for laminary flow of the fluid section S4 carried by piston head 20 and the joining surface of part 2.

A slot 23 on the joining surface of part 2 connects the passage 12 with the bore 3 of the main piston 4 so as to provide fluid communication between inlet port 18 and outlet port 13 when piston 4 is in abutting relationship against the bottom of bore 3 constituted by the joining surface of part 2. This position corresponds, in fact, to the one that results from the pull-back of the operating rod 7 toward the right (i.e. pedal 8 at rest) as shown in FIG. 2 and the withdrawal of push rod 5 into bore 9. To this effect, a return spring 24 with light calibration engages the bottom and end portion of bore 3 and piston 4.

An axial bore hole 25 connects the two faces of piston 4 and this bore hole 25 opens up at one end to a cap member 26' mounted on the free extremity of push rod 5. Finally a passage 12' connects outlet port 13 to a control chamber C of piston 6. The other end of bore hole 25 opens up into chamber 27 which contains the return spring 24. It is to chamber 27 that the connecting port 28 communicates as well as a connecting passage 29 that communicates bore 10 to chamber 27.

The connecting port 28 feeds the receiver clutch control cylinder 31 through outside conduit 30. Piston 32 of receiver cylinder 31 is connected by a rod linkage member to a conventional ball bearing disengagement stop 34 in a clutch mechanism (not shown). It is to be understood that booster pump 16 comprises a conventional device, not further described here, for the adjustment of pressure and/or flow.

In accordance with the particular feature of the invention, the pressurized hydraulic circuit may include a receiver member 35 placed in series with conduit 17 between the pump 16 and the transmitter cylinder part 2. Receiver 35 may be any hydraulic device used in automotive vehicles such as a power steering or hydraulic suspension mechanism, a roadability compensator, etc., whose operation is compatible with the device which constitutes this invention.

The embodiment cited above as a non-limiting example relates to a power-assisted clutch control, but it is obvious that other applications or combinations of elements can be conceived and that modifications can be made in the design of the booster cylinder without departing from the scope of the invention.

Such a device operates in the following manner. During disengagement, the action of pedal 8 on the operating rod 7 moves piston 6 and push rod 5 to the left (i.e. in accordance with FIG. 1). The cap 26' seals bore hole 25 so as to constitute a valve 26 and piston 4 is thrust to the left. The pressure in passage 29 increases and the pressure increase on section S3 of control piston 11 moves the latter to the right. The constriction 19 is thus reduced and allows laminar flow of the fluid fed through passage 12. As a consequence, hydraulic pressure increases in passage 12 and this pressure PA acts, on the one hand, on the control surface of piston 11, in opposition to the control pressure PE in the receiver cylinder 31 which acts on the section S3 of the same piston 11 and, on the other hand, on the face of main piston 4, with a section S1-S2 directed toward valve 26.

The equations of equilibrium for pistons 4 and 11 can be written as follows:

$$F - PE \times S1 + PA (S1 - S2) = 0$$

$$PE \times S3 - PA \times S4 = 0$$

where F represents the thrust transmitted by operating rod 7 disregarding that of spring 24.

The effort or force that the pedal must overcome in rod 5 is given by the formula:

$$F = PE \times S1 - PE(S3/S4)(S1 - S2).$$

where $F = PE \times K$, and K is a constant.

It can thus be noted that the effort or force on push rod 5 (and therefore on pedal 8) can be diminished by reducing control section S4. This is particularly advantageous since the same device can readily be adapted to various control systems. Only the dimensions of the auxiliary piston head need be adjusted if the clutch control effort or force F is to be kept the same despite the dimensional disparity among the clutches and/or power ratings of vehicle engines. A control piston with a section S4 greater than section S3 will have to be used if the booster pressure PA is to remain lower than control pressure PE. It is obvious that the same result can be achieved by proper selection of sections S1, S2, S3 and S4.

The principal advantage of the device described hereinabove resides in the fact that the effort or force transmitted to the receiver cylinder is proportional to the control effort or force Fp exerted on the pedal.

Another advantage of the device resides in the fact that the control of the receiver becomes hydrostatic such as the one that a conventional cylinder would use when the source of fluid breaks down or fails.

The fact is that, should the pressure on control section S4 of piston 11 become zero, the leftward shift (see FIG. 1) of push rod 5 will cause the bore hole 25 in piston 4 to be sealed. The movement of piston 4 to the left increases the pressure PE.

Another advantage of the invention is due to the presence of the cap 26 insofar as, when pedal 8 is at rest, the pressure PA, transmitted through passage 12', pushes back guide piston 6 and rod 5. Piston 4 is simultaneously pushed back by spring 24 and by the residual pressure in chamber 27 to the point of coming into contact with part 2. At that moment, the cap 26 is no longer bearing against piston 4 and no longer seals bore hole 25 which can thus communicate with feed passage 12' through slot 23.

As a result, it becomes possible for the fluid to circulate from connection port 28 to inlet port 18, and vice versa. This constructive feature thus permits correct filling and draining of the clutch circuit. In addition, after each period of operation, as piston 4 returns to the release position, the pressure PE drops to a minimum value owing to the flow toward reservoir 15 through bore hole 25 and outlet port 13, but it would be possible just as well to replenish the circuit with fluid of the same circuit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for the power-assisted control of a hydraulic transmitter comprising:
   a transmitter cylinder having a first and second bore provided therein;
   a main piston including a bore hole, disposed in said cylinder;
   valve means disposed in the bore of the cylinder;
   a fluid source communicating with said cylinder; and,
   a control piston movably disposed in said second bore and having a control section and a second section and wherein the control section of the control piston is larger than the second section of said control piston.

2. A device as set forth in claim 1 further comprising;
   an outlet port and a first and second passage formed in said cylinder;
   an inlet port formed in said cylinder;
   a head member formed on said control piston, said control section of said control piston being formed by said head member wherein said cylinder includes a first chamber, formed at one end of said second bore and within which said head member is movable, communicating, on the one hand, with said first passage, said first passage being disposed between said first chamber and said outlet port, and, on the other hand, communicating with said second passage.

3. A device as set forth in claim 2 further comprising a receiver in series fluid communication with said fluid source, said fluid source communicating with said second passage.

4. A device as set forth in claim 1 further comprising a feed conduit;
   a receiver cylinder communicating via said conduit with said bore hole through said main piston to said second passage;
   a push rod disposed within said cylinder;
   an operating rod engaging said push rod; and a cap member disposed in said cylinder adjacent said push rod for interrupting communication through said main piston when activated by a control thrust communicated to said operating rod.

5. A device as set forth in claim 2 wherein said cylinder includes a third passage formed therein and a control chamber, said third passage communicating said outlet port with said control chamber.

6. A device as set forth in any of claim 1 or 5, wherein said cylinder comprises a body member formed of a first and second part joined along a hermetically sealed surface, against which said first chamber is disposed and which defines with said head member said control section of said control piston.

* * * * *